(12) United States Patent
Ruckart et al.

(10) Patent No.: US 7,391,761 B1
(45) Date of Patent: Jun. 24, 2008

(54) SYSTEM AND METHOD FOR VOICE OVER INTERNET PROTOCOL USING A STANDARD TELEPHONE SYSTEM

(75) Inventors: John P. Ruckart, Atlanta, GA (US); Rimas J. Rauba, Roswell, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 916 days.

(21) Appl. No.: 10/024,135

(22) Filed: Dec. 21, 2001

(51) Int. Cl.
*H04L 12/66* (2006.01)

(52) U.S. Cl. ...................................................... 370/352

(58) Field of Classification Search ......... 370/351–356, 370/357, 389, 395.1, 395.2, 395.21, 395.5, 370/395.51, 395.52, 395.6, 465, 466, 230, 370/401, 493, 467, 235, 259, 271; 709/204; 379/88.17, 88.25, 220.01, 219, 88.2
See application file for complete search history.

(56) References Cited

U.S. PATENT DOCUMENTS

| | | |
|---|---|---|
| 4,935,951 A | 6/1990 | Robinson et al. |
| 4,993,058 A | 2/1991 | McMinn et al. |
| 5,012,507 A | 4/1991 | Leighton et al. |
| 5,161,180 A | 11/1992 | Chavous |
| RE34,677 E | 7/1994 | Ray et al. |
| 5,511,111 A | 4/1996 | Serbetcioglu et al. |
| 5,526,406 A | 6/1996 | Luneau |
| 5,621,379 A | 4/1997 | Collins |
| 5,673,304 A | 9/1997 | Connor et al. |
| 5,724,412 A | 3/1998 | Srinivasan |
| 5,796,806 A | 8/1998 | Birckbichler |
| 5,805,587 A | 9/1998 | Norris et al. |
| 5,883,942 A | 3/1999 | Lim et al. |
| 5,940,474 A | 8/1999 | Ruus |
| 5,940,475 A | 8/1999 | Hansen |
| 6,009,148 A | 12/1999 | Reeves |
| 6,011,473 A | 1/2000 | Klein |
| 6,104,800 A | 8/2000 | Benson |
| 6,144,644 A | 11/2000 | Bajzath et al. |
| 6,208,718 B1 | 3/2001 | Rosenthal |
| 6,208,726 B1 | 3/2001 | Bansal et al. |
| 6,219,413 B1 | 4/2001 | Burg |
| 6,259,692 B1 | 7/2001 | Shtivelman |
| 6,307,920 B1 | 10/2001 | Thomson et al. |

(Continued)

OTHER PUBLICATIONS

"VoIP Patent Applied For," Techweb News, Author and Date Unknown, p. 1.

(Continued)

*Primary Examiner*—Doris H. To
*Assistant Examiner*—Kerri M Rose
(74) *Attorney, Agent, or Firm*—Myers Bigel Sibley & Sajovec

(57) ABSTRACT

A system and method is provided for routing telephone calls on a standard telephone network to one of a PSTN network and a VoIP network. The system comprises at least one telephone capable of making local and long distance calls on the network. A Central Office is coupled to the telephone and comprises a trigger for identifying calls to be routed to either a VoIP platform or the PSTN network. Calls to be converted to IP protocol are routed to a VoIP platform. An IP network is coupled to the VoIP platform and routes VoIP calls to one or more devices in communication with the telecommunications system.

15 Claims, 2 Drawing Sheets

U.S. PATENT DOCUMENTS

| | | |
|---|---|---|
| 6,310,946 B1 | 10/2001 | Bauer et al. |
| 6,343,115 B1 | 1/2002 | Foladare et al. |
| 6,347,136 B1 | 2/2002 | Horan |
| 6,356,756 B1 | 3/2002 | Koster |
| 6,363,065 B1 * | 3/2002 | Thornton et al. ............. 370/352 |
| 6,434,126 B1 | 8/2002 | Park |
| 6,476,763 B2 | 11/2002 | Allen, Jr. |
| 6,480,581 B1 * | 11/2002 | Wu et al. ................. 379/93.01 |
| 6,529,500 B1 | 3/2003 | Pandharipande |
| 6,603,977 B1 | 8/2003 | Walsh et al. |
| 6,608,886 B1 | 8/2003 | Contractor |
| 6,614,781 B1 * | 9/2003 | Elliott et al. ................ 370/352 |
| 6,622,016 B1 | 9/2003 | Sladek et al. |
| 6,624,754 B1 | 9/2003 | Hoffman et al. |
| 6,661,785 B1 | 12/2003 | Zhang et al. |
| 6,665,293 B2 * | 12/2003 | Thornton et al. ............. 370/352 |
| 6,665,388 B2 | 12/2003 | Bedingfield |
| 6,665,611 B1 | 12/2003 | Oran et al. |
| 6,674,745 B1 | 1/2004 | Schuster et al. |
| 6,678,357 B2 | 1/2004 | Stumer et al. |
| 6,680,998 B1 | 1/2004 | Bell et al. |
| 6,703,930 B2 | 3/2004 | Skinner |
| 6,704,305 B2 * | 3/2004 | Emerson, III ............... 370/352 |
| 6,718,021 B2 | 4/2004 | Crockett et al. |
| 6,763,020 B1 * | 7/2004 | Hon ........................... 370/356 |
| 6,771,742 B2 | 8/2004 | McCalmont et al. |
| 6,792,081 B1 | 9/2004 | Contractor |
| 6,804,338 B1 | 10/2004 | Chen |
| 6,842,448 B1 | 1/2005 | Norris et al. |
| 6,868,074 B1 | 3/2005 | Hanson |
| 6,912,399 B2 | 6/2005 | Zirul et al. |
| 6,940,950 B2 | 9/2005 | Dickinson et al. |
| 7,092,380 B1 * | 8/2006 | Chen et al. .................. 370/352 |
| 7,257,386 B1 | 8/2007 | McDonnell et al. |
| 7,257,387 B2 | 8/2007 | Laliberte |
| 2001/0005372 A1 * | 6/2001 | Cabe et al. .................. 370/401 |
| 2001/0043684 A1 * | 11/2001 | Guedalia et al. ......... 379/88.17 |
| 2002/0059374 A1 * | 5/2002 | Nuestro ...................... 709/204 |
| 2002/0072348 A1 | 6/2002 | Wheeler et al. |
| 2002/0101860 A1 * | 8/2002 | Thornton et al. ............. 370/352 |
| 2002/0160745 A1 | 10/2002 | Wang |
| 2003/0211839 A1 | 11/2003 | Baum et al. |
| 2003/0216148 A1 | 11/2003 | Henderson |
| 2004/0037403 A1 | 2/2004 | Koch |
| 2004/0057425 A1 | 3/2004 | Brouwer et al. |
| 2004/0101123 A1 | 5/2004 | Garcia |
| 2004/0140928 A1 | 7/2004 | Cleghorn |
| 2005/0047574 A1 | 3/2005 | Reid |
| 2005/0063519 A1 | 3/2005 | James |
| 2005/0151642 A1 | 7/2005 | Tupler et al. |
| 2005/0175166 A1 | 8/2005 | Welenson et al. |
| 2005/0190750 A1 | 9/2005 | Kafka |
| 2005/0190892 A1 | 9/2005 | Dawson et al. |
| 2005/0232243 A1 | 10/2005 | Adamczyk |
| 2005/0250468 A1 | 11/2005 | Lu |

OTHER PUBLICATIONS

"Bells ringing in Net Phone 911," CNET News.com by Ben Charny, staff writer, *Daily Clips*, Mar. 7, 2005, pp. 1-2.

"VoIP Emergency Calling Services," Intrado Informed Responses, 2003, Author Not Available, Intrado Inc., Longmont, Colorado, USA pp. 1-2.

"BellSouthE911 Service Interfaces to Customer Premises Equipment at a Public Safety Answer Point," Technical Reference, Issue 6, TR73528, Apr. 2001.

"The Development of 9-1-1," http://www.sorc911.com/9-1-1-%20History.htm. May 21, 2004.

"FCC Addresses VoIP 911 Calls," BellSouth NewsSource from Staff and News Services, by Russell Grantham, May 8, 2005, p. 1.

"AG Files Suit Against Vonage Over 911," BellSouth NewsSource, by Ted Gotsch, May 5, 2005, pp. 1-2.

"FCC Boss Pushes 911 Plan," BellSouth NewsSource from Staff and News Services, by Renee Degross, Apr. 28, 2005, pp. 1-2.

U.S. Appl. No. 11/089,296, filed Mar. 30, 1999, Yoshioka Toru.

"Helpless in a 911 emergency: Some Internet Phone Services Leave Consumers Without a Lifeline," Newsday, Richard J. Dalton, Jr., May 11, 2005, pp. 1-3.

"Tests Show Many Cellphone Calls to 911 Go Unlocated," The Wall STreet Journal, By Anne Marie Squeo, May 19, 2005, pp. 1-3.

FCC to Rule on 911 Access for Web Phones, Washington Post, by Yuki Noguchi, Washington Post Staff Writer, May 18, 2005, pp. 1-3.

BellSouth Clarifies View on VoIP '911" Availability, TR Daily, by Lynn Stanton, May 17, 2005, p. 1.

"Level 3 Communications Sees 911 as its Edge in Internet Telephony," by Heather Draper, Dow Jones Newswires, Jun. 29, 2005, pp. 1-2.

US 5,905,788, 05/1999, Bauer et al. (withdrawn)

* cited by examiner

SYSTEM AND METHOD FOR VOICE OVER INTERNET PROTOCOL USING A STANDARD TELEPHONE SYSTEM

FIELD OF THE INVENTION

The present invention relates to a method and apparatus for using a telephone service network to route identified telephone calls, preferably all long distance telephone calls, from a device, such as a caller's telephone, through a Voice over Internet Protocol (VoIP) calling platform to another device on the network. More particularly, the present invention relates to a system and a method for identifying and routing identified telephone calls from a standard telephone service device to a VoIP network, converting them to IP protocol, and routing the calls to end points on the service network.

BACKGROUND OF THE INVENTION

The process of routing telephone calls over the Internet, rather than using traditional phone lines (i.e., POTS, PSTN), goes by many names: Internet telephony, IP (Internet Protocol) telephony, iTelephony, Voice over IP (VoIP) and e-calling. Recently, Voice over Internet Protocol (VoIP) has become a more widely used method of communicating because telephone calls can be carried on the Internet. Uses of software/hardware combinations that use the packet-switching methods of the Internet and other digital data communications to establish voice communications via the Internet have become more and more common. The most immediate advantage of these systems is that VoIP does not incur long distance toll charges.

VoIP implementations enable users to carry voice and other traffic (for example, telephone calls and faxes) over an Internet network. There are several advantages of VoIP, including low-cost phone calls, add-on services and unified messaging, and merging of data/voice infrastructures. Most VoIP systems consist of a number of different components, including some form of software/hardware combination that converts voice conversations to Internet Protocol. In VoIP, a digital signal processor (DSP) segments the voice signals into frames and stores them in voice packets. The voice packets are transported using Internet protocol (IP) in compliance with one of the specifications for transmitting multimedia (voice, video, fax and data) across a network, e.g., H.323 (ITU), MGCP (level 3, Bellcore, Cisco, Nortel), MEGACO/H.GCP (IETF), SIP (IETF), T.38 (ITU), SIGTRAN (IETF), Skinny (Cisco). VoIP is a delay-sensitive application. Accordingly, a well-engineered, end-to-end network is necessary to use VoIP successfully. Examples of services provided by a VoIP network include: phone to phone, PC to phone, phone to PC, fax to e-mail, e-mail to fax, fax to fax, voice to e-mail, IP Phone, transparent CCS (TCCS), toll free number (1-800), class services, call center applications, VPN, Unified Messaging, Wireless Connectivity, IN Applications using SS7, IP PABX and soft switch implementations, chat and video conferencing.

While VoIP is becoming more commonplace, the technology has not been developed to the point where it can replace the services and quality provided by the public switched telephone network (PSTN). Cost savings for using VoIP are most easily realized in the area of long distance services. In this area, VoIP provides a competitive threat to providers of traditional telephone services that will clearly stimulate improvements in cost and function throughout the industry.

Some VoIP systems offer voice override IP products for use on a personal computer (PC). For example, the user dials a number via a computer dial pad provided on a webpage. The PC converts the voice transmission to IP protocol. The call is transferred to an IP network and eventually the call is completed via a landline network or the like. Other known VoIP systems offer an IP telephone or a device where a user can simply pick up a handset and dial a number and the device will complete the call in voice override. The handset avoids the voice spectrum of the phone line. Instead, the IP phone typically is connected via a DSL line to a box or the like that connects the voice transmission to IP protocol. All of these known systems require special hardware, either an intermediate box, or software at the user's end. Some systems require an "always-on" connection to a network, typically a DSL line. These systems often experience poor voice quality and connectivity problems.

FIG. 1 depicts examples of known VoIP architectures. As depicted in FIG. 1, by implementing software or hardware, such as an IP telephone 105, or by connecting compatible hardware to an existing broadband line, users can complete IP telephone calls. For example, user 101 using a software application and a PC accesses an Internet website via a modem 120. The user "dials" a long distance call by typing in a number using an "Applet" telephone dialpad, or the like, which is displayed on a web page. Another example is illustrated by telephone 103, which is connected to box 110 provided by an IP telephone service. Box 110 converts the analog voice call to IP protocol and couples the voice stream via a broadband line 130, e.g., a DSL line, to a switch in a Central Office 150. Central office 150 routes the call, via Internet 160, to a VoIP Gateway 170 and then on to second Central Office 180. From there, the call is routed via PSTN Central Office 180 to a second caller 109. Finally, another example is illustrated when caller 105 uses a special IP telephone as mentioned above. The IP telephone 105 serves in much the same manner as box 110, converting voice data to IP protocol.

As will be appreciated, these systems all require, in one form or another, hardware, software, or both, at the user's end to create a VoIP telephone call. This need for extra hardware and/or software raises the cost of making the calls, increases the need for customer service and can generate customer dissatisfaction.

Accordingly, a need exists for a method and apparatus to enable users to enjoy the convenience and cost savings of a VoIP system using their standard telephone (POTS). In order to fully capitalize on the benefits of VoIP, a need exists for a system and method to make IP telephone calls using a standard telephone without having to, for example, dial extra digits, use a special device, implement software applications, or dial in to a network with a modem at the user's end.

SUMMARY OF THE INVENTION

The present invention is a system and method wherein predefined telephone calls on a standard telephone network, e.g., toll calls, are converted to IP protocol and routed to bypass at least a portion of a public switch telephone network (PSTN). Routed calls are transferred via a switch to a VoIP system architecture. Preferably, all toll calls from a subscriber's line are routed to the VoIP network utilizing an identification system such as the automatic number identification (ANI), predefined time slots, "1+" dialing, area code, DNIS, or the like. Embodiments of the invention include features such as providing several lines on a single account (i.e., second phone line, cellphone, etc.), allowing for account codes on a single subscriber's line (e.g., different members of a family, members of a club, other groups, can have their own account on a single line) and multi-location functionality.

DETAILED DESCRIPTION OF THE INVENTION

According to embodiments of the present invention, it is possible to use a standard subscriber's telephone as part of a standard telephone network to make VoIP telephone calls. Embodiments of the invention include a method of converting voice data calls to IP protocol at a Central Office of a PSTN and routing them to other users of the system via a VoIP platform as part of the PSTN network.

Figure 1:
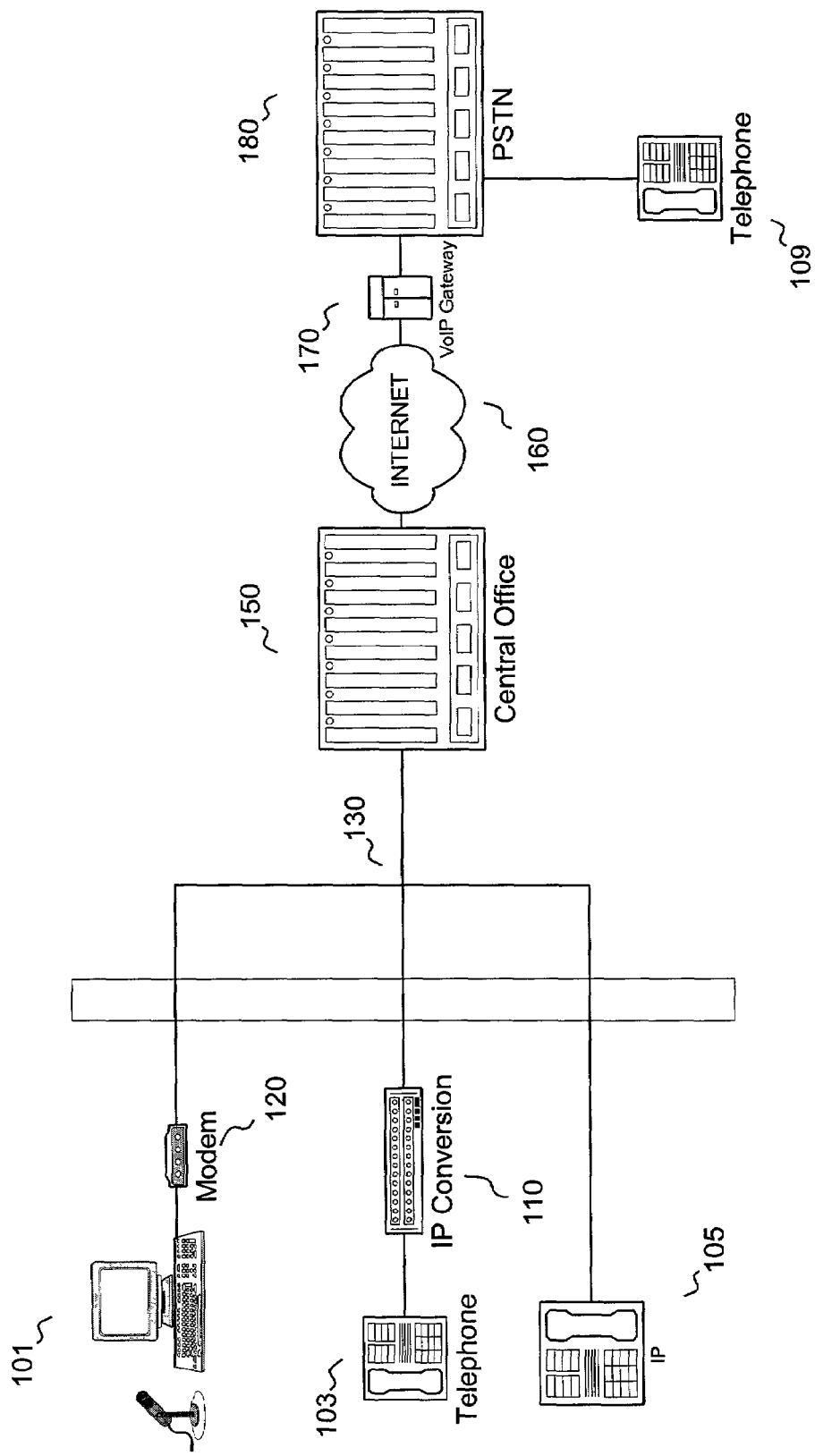
FIG. 1 is a schematic diagram of an overview of exemplary VoIP architectures.
Figure 2:
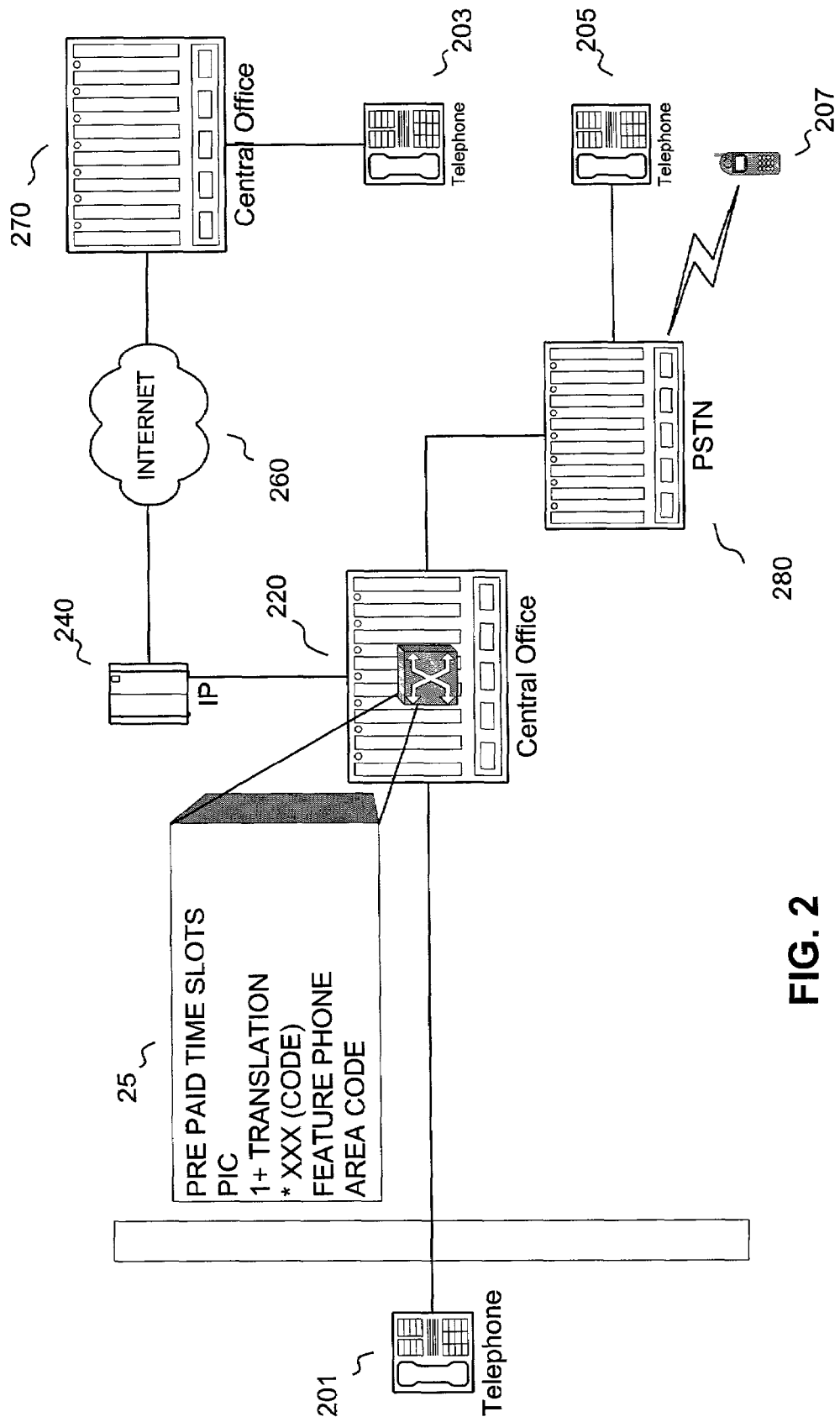
FIG. 2 is a schematic diagram illustrating an exemplary implementation of an embodiment of the present invention.

As will be appreciated, an exemplary embodiment of the present invention is depicted in FIG. 2. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

A user is in communication with a standard telephone network via a device. The user is using, for example, a home telephone 201, and initiates a call, which is routed to a Central Office 220. A trigger 25 in the Central Office is configured to identify the call as one to be converted to IP protocol and carried over the VoIP network (e.g., a toll call, pre-identified calls, time slots). The trigger may be in the switch or part of the network. The trigger may be included in a user's telephone.

As shown in FIG. 2, calls to be routed to a VoIP network are identified by a trigger, including, for example, prefixes such as "1+", *99, area code, PIC and the like. Additionally, calls could be routed to the VoIP network on a timer basis (e.g., all calls after 7:00 p.m. EST). Preferably, all or most long distance calls will be routed to IP gateway 240 and converted to IP protocol. Alternatively, the calls to be routed to the standard telephone network may be identified by the trigger means.

Accordingly, by implementing embodiments of the invention, calls may be routed either over a conventional telephone network or over a TCP/IP network. As will be appreciated by those skilled in the relevant art(s), this invention is equally applicable to Intranets, Extranets and other private networks or the like. For example, a business could convert certain predetermined calls to IP format and save costs by connecting users via a company Intranet.

As shown in FIG. 2, the present invention preferably includes one or more Central Offices 220 capable of routing calls to a telephone system (POTS) 280 and capable of routing calls to a VoIP platform 240. Of course, VoIP platform 240 may be part of Central Office 220 or it may be located in a separate location. The VoIP platform 240 converts the calls it receives to IP protocol and routes them to an Internet, Intranet or Extranet application. From there, converted calls are routed to end user devices of the network.

In this embodiment, Central Office 220 includes a triggering means for selecting calls to be routed to the VoIP platform 240. Calls may be selected based on predefined criteria, including a specific digit, area code, ANI, DNIS, subscriber phone numbers, call volume, predefined time slots, and the like. In other embodiments, a trigger may be located at, for example, a subscriber's telephone. For example, user 201 may initiate a call with a feature phone that has, for example, a "VoIP key" (i.e., a designated button, a switch or a series of keys such as a subscriber's code) for allowing the user to initiate calls in VoIP. In yet another embodiment, user 201 may initiate a VoIP call by dialing a temporary code that may be purchased at, for example, a convenience store, or won in a special awards program or even purchased on-line. For example, users may purchase "VoIP minutes" to be used on their personal telephone, business telephone, and the like. By implementing embodiments of this invention, users may initiate VoIP telephone calls from a variety of telephones and locations without the need of a PC, an IP telephone, a modem, a converter box, software and the like.

As will be appreciated, in another embodiment, a switch network in a terminal of a telephone service provider may contain one or more trigger s, or a trigger mechanism, configured to identify incoming calls to be routed to the POTS 280 (e.g., all calls where there is no "1+" dialing, or predefined area codes, DNIS and the like). Of course, by utilizing such architecture, all calls not routed to POTS 280 are routed to IP platform 240.

In another embodiment, all calls incoming to Central Office 220 during a specific time slot are converted to IP and routed to the IP network via VoIP system 240. Additionally, cellular calls may be received by Central Office 220 or a mobile telephone switching office (MTSO) and dispatched in similar manner. PSTN 280 can complete cellular calls via a second MTSO.

Thus, using the embodiments discussed above, two devices can engage in direct communications, in indirect communications or a combination thereof, via one or more networks. For example, one or more communications channels of the one or more networks can carry the data communications. Examples of a network include a Wide Area Network (WAN), a Local Area Network (LAN), the Internet, a wireless network, a wired network, a connection-oriented network, a packet network, an Internet Protocol (IP) network, or a combination thereof. A network can include wired communication links (e.g., coaxial cable, copper wires, optical fibers, and so on), wireless communication links (e.g., satellite communication links, terrestrial wireless communication links, wireless LANs, and so on), or a combination thereof.

In accordance with an embodiment of the present invention, instructions are stored on a computer-readable medium and are executable by a processor to perform a method. The computer-readable medium is typically a device that stores digital information. For example, a computer-readable medium includes a hard disk, a floppy disk, a tape and a compact disc read-only memory (CD-ROM), all as known in the art for storing software and data. A processor suitable for executing instructions adapted to be executed accesses the computer-readable medium. The term "adapted to be executed" is meant to encompass any instructions that are ready to be executed in their present form (e.g., machine code) by a processor, or require further validation (e.g., compilation, decryption, or provided with an access code, etc.) to be ready to be executed by a processor.

In describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, unless that order is explicitly described as required by the description of the process in the specification. Otherwise, one skilled in the art can readily appreciate that the sequences may be varied and still remain within the spirit and scope of the present invention.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A telecommunications system for routing telephone calls comprising:
   a trigger configured to identify automatically an initiated telephone call for packetized or non-packetized routing wherein the trigger is part of a feature phone and identified by the feature phone and not identified by the router; and
   further comprising at least one of the following:
   wherein the initiated telephone call is identified based on "1+" dialing,
   wherein the initiated telephone call is identified based on "ANI;"
   wherein the initiated telephone call is identified based on an area code;
   wherein the initiated telephone call is identified based on primary interexchange carrier (PIC);
   wherein the initiated telephone call is received from a cellular telephone;
   wherein the initiated telephone call is received from a telephone device having a plurality of standard telephone lines on the standard telephone network and initiated telephone calls from the plurality of telephone lines are identified based on associated predefined account codes; and
   wherein the system further comprises a telephone device coupled to the router, that generates the incoming telephone call and wherein the telephone device comprises a feature phone that includes identification means for identifying calls to be routed over the packetized protocol network and the feature phone is not an Internet phone.

2. The system of claim 1, wherein the initiated telephone call is identified based on "1+" dialing.

3. The system of claim 1, wherein the initiated telephone call is identified based on "ANI."

4. The system of claim 1, wherein the initiated telephone call is identified based on an area code.

5. The system of claim 1, wherein the initiated telephone call is identified based on PIC.

6. The system of claim 1, wherein the initiated telephone call is received from a cellular telephone.

7. The system of claim 1, wherein the initiated telephone call is received from a telephone device having a plurality of standard telephone lines on the standard telephone network and wherein initiated telephone calls from the plurality of telephone lines are identified based on associated predefined account codes.

8. The system of claim 1, further comprising a telephone device coupled to the router, that generates the incoming telephone call and wherein the telephone device comprises a feature phone that includes identification means for identifying calls to be routed over the packetized protocol network.

9. A telecommunications system for selectively routing telephone calls using a Voice over Internet Protocol (VoIP) network or a circuit switched telephone network comprising:
   a trigger configured to identify automatically an initiated telephone call for packetized or non-packetized routing wherein the trigger is part of a feature phone and identified by the feature phone and not identified by the router; and
   a Voice Over Internet Protocol platform coupled to the router and configured to receive the telephone call from the router when the call is routed over the VoIP network and to convert the telephone call to VoIP for routing over the VoIP network;
   further comprising at least one of the following:
   wherein the initiated telephone call is identified based on "1+" dialing;
   wherein the initiated telephone call is identified based on "ANI;"
   wherein the initiated telephone call is identified based on an area code;
   wherein the initiated telephone call is received from a cellular telephone;
   wherein the initiated telephone call is received from a telephone device having a plurality of standard telephone lines on the standard telephone network and initiated telephone calls from the plurality of telephone lines are identified based on associated predefined account codes; and
   wherein the system further comprises a telephone device coupled to the router, that generates the initiated telephone call and wherein the telephone device comprises a feature phone that includes identification means for identifying calls to be routed over the packetized protocol network and the feature phone is not an Internet phone.

10. The system of claim 9, wherein the initiated telephone call is identified based on "1+" dialing.

11. The system of claim 9, wherein the initiated telephone call is identified based on "ANI."

12. The system of claim 9, wherein the initiated telephone call is identified based on an area code.

13. The system of claim 9, wherein the initiated telephone call is received from a cellular telephone.

14. The system of claim 9, wherein the initiated telephone call is received from a telephone device having a plurality of standard telephone lines on the standard telephone network, wherein the initiated telephone call from the plurality of telephone lines is identified based on an associated predefined account code.

15. The system of claim 9, further comprising a telephone device coupled to the router, that generates the initiated telephone call and wherein the telephone device comprises a feature phone that includes identification means for identifying calls to be routed over the packetized protocol network.

* * * * *